(12) United States Patent
Schoeberl et al.

(10) Patent No.: US 7,602,736 B2
(45) Date of Patent: Oct. 13, 2009

(54) METHOD FOR TESTING A NETWORK, AND CORRESPONDING NETWORK

(75) Inventors: Thomas Schoeberl, Hildesheim (DE); Wolfgang Baierl, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 650 days.

(21) Appl. No.: 10/450,733

(22) PCT Filed: Dec. 4, 2001

(86) PCT No.: PCT/DE01/04535

§ 371 (c)(1),
(2), (4) Date: Dec. 22, 2003

(87) PCT Pub. No.: WO02/49283

PCT Pub. Date: Jun. 20, 2002

(65) Prior Publication Data

US 2004/0090925 A1      May 13, 2004

(30) Foreign Application Priority Data

Dec. 15, 2000   (DE) .................... 100 62 545

(51) Int. Cl.
*H04L 1/00*   (2006.01)
(52) U.S. Cl. ...................... 370/255; 370/241
(58) Field of Classification Search .............. 370/241, 370/248–251, 254, 256–258, 252; 709/202, 709/224, 244; 375/211; 713/176
See application file for complete search history.

(56) References Cited

U.S. PATENT DOCUMENTS 5,138,615 A * 8/1992 Lamport et al. ............. 370/400
5,606,664 A * 2/1997 Brown et al. ................ 709/224
5,654,985 A * 8/1997 Crayford et al. ............ 375/211
5,771,274 A * 6/1998 Harris ..................... 379/22.03
5,948,055 A * 9/1999 Pulsipher et al. ............ 709/202
6,038,665 A * 3/2000 Bolt et al. .................... 713/176
6,046,988 A   4/2000 Schenkel et al.
6,061,332 A * 5/2000 Branton et al. .............. 370/241
6,061,735 A * 5/2000 Rogers ....................... 709/239
6,108,702 A * 8/2000 Wood ......................... 709/224
6,131,119 A * 10/2000 Fukui ......................... 709/224
6,160,796 A * 12/2000 Zou ............................ 370/257

FOREIGN PATENT DOCUMENTS

| EP | 0 930 747 | 7/1999 |
|---|---|---|
| EP | 1 047 224 A2 | 10/2000 |
| JP | 2000267982 | 9/2000 |
| JP | 2000307603 | 11/2000 |
| WO | 97 49057 | 12/1997 |
| WO | 98 44400 | 10/1998 |

* cited by examiner

*Primary Examiner*—Kwang B Yao
*Assistant Examiner*—Andrew Lai
(74) *Attorney, Agent, or Firm*—Kenyon & Kenyon LLP

(57) ABSTRACT

A method for testing a network made up of network nodes and devices connected to network nodes, includes: determining the network topology, using at least the network topology, using at least the number of network nodes, the network-node identity, and the wiring of the network-node inputs and outputs; and comparing a current network topology to a permanently stored, reference network topology for the network, in order to detect a change in the number and/or type of devices connected to the network, in the number and/or type of network topology, and/or in the number and/or type of network nodes at which a change is present.

14 Claims, 3 Drawing Sheets

| length 16 | CRC 16 |
|---|---|
| generation number 32 ||
| node_count 16 | self_id_count 16 |
| self_id_packet [0] 32 ||
| . . . ||
| self_id_packet [self_id_count-1] 32 ||

Fig. 5

| 10 | PHY_ID | 0 | L | gap_cnt | sp | del | c | pwr | p0 | p1 | p2 | i |
|---|---|---|---|---|---|---|---|---|---|---|---|---|
| msb | | | | Logical inverse of first 32 bits | | | | | | | | lsb |

Fig. 6

| 01h 8 | vendor_id 24 |
|---|---|

Fig. 7

| info_length 8 | crc_length 8 | rom_crc_value 16 |
|---|---|---|
| bus_info_block |||
| root_directory |||
| unit_directories |||
| root and unit leaves |||
| vendor_dependent_information |||

Fig. 8

METHOD FOR TESTING A NETWORK, AND CORRESPONDING NETWORK

FIELD OF THE INVENTION

The present invention relates to a method for testing a network, which is made up of network nodes and devices connected to network nodes. The present invention also relates to a network having network nodes interconnected in a network topology and devices at the network nodes.

BACKGROUND INFORMATION

The IEEE-1394 standard describes a network, which has network nodes and offers a serial bus connection between different devices, that has a high data-transmission rate. Such a network may also be known by the name of FireWire or iLink. The network may be made up of network nodes, which have one or more network-node outputs. The network nodes may be contained in devices, such as a radio, monitor, CD player, etc. Additional network nodes may be connected to network-node inputs and outputs.

The superordinate node of a network may be referred to as a root. Any node may become the root. In the topology, two nodes may have a child and parent relationship to each other, i.e. the superordinate node may be designated as a parent, and the subordinate node may be designated as a child. Therefore, a node may simultaneously be the parent of one node and the child of another node.

Network nodes that are only connected to one additional network node may be referred to as terminal nodes. Network nodes having two or more network nodes connected may be designated as branch nodes.

The network forming the basis of the present invention may be designed to independently configure itself without a host processor, the determination of the network topology, i.e. the configuration of the network, being carried out after the network is reset. A reset of the network may be initiated when, for example, a device or network node is removed from the network or an additional device or network node is added to the network. The configuration of a network may be carried out in three steps:

1. bus initialization:

The bus initialization may be triggered by a reset command, the individual network nodes transmitting the reset signal to the other network nodes. All information regarding the previous network topology may be deleted in the network nodes, and the network nodes may be shifted into the initialization state.

2. branch identification:

During the branch identification, the topology of the network may be detected, and the relationship of the network nodes to each other may be identified. The independent identification of the network nodes as parent and child with respect to each other may allow a root network node to be defined as a starting node, which may assume the bus management or network management.

3. self-identification:

To manage the network, the network topology and the physical characteristics of the network nodes may need to be known. To this end, the network nodes may transmit physical characteristics in a self-ID packet during self-identification. The transmission of the data regarding the individual network nodes may occur in the order of the topology configuration of the network, so that the position of the network nodes in the network may be identified. The root network node may store the number of network nodes connected and their self-ID packet inside the topology map. The network topology, network-node number phy_id, and the physical characteristics of the network nodes connected may be extracted with the aid of the topology map.

A register memory, in which a network-node identification number or device identification number and further information regarding the network or the device may be stored, may be provided in each network node for the network configuration. Each device or each network node may be provided with an unequivocal identification of the manufacturer, vendor ID, which may be likewise stored in the register memory. In addition, a unique number (chip ID) of the integrated circuit, in which the hardware and software for producing the network node is incorporated, may be stored in the register memory. The physical characteristics of the network node and the states of the corresponding network outputs (ports) may be input in the register memory as additional information items. The characteristics may include, for example, speed (sp=speed), delay time (del=delay), pause interval (gap-cnt=gap-count), voltage class (pwr=power class), etc.

The root network node may be provided with a register memory for storing the so-called network-topology map, which may include the number of network nodes connected and the information transmitted from the network nodes to the root network nodes regarding the characteristics of the specific network nodes (self-ID packets). In this connection, each network node may be assigned a network-node number phy_id by the root network node. The information items (self-ID packet) transmitted by a network node to the root network node may include network-node number (phy_id), pause number (gap-cnt), speed (sp), delay (del), voltage class (pwr), as well as additional information.

Data may be transmitted by a network node to another network node.

A serial bus may be defined by the IEEE-1394 standard. Examples of similar buses include MOST, HiQoS, CAN, Universal Serial Bus (USB), etc., which may likewise represent a network of the species.

In networks, a reset of the network may be carried out after the network topology is changed, e.g. by adding or removing devices, and the information regarding the previous network topology may be lost. This may be especially problematic when external devices are added or the network is manipulated.

SUMMARY OF THE INVENTION

An exemplary method of the present invention relates to a method for testing a network, which may be made up of network nodes and devices connected to network nodes, the network topology being determined by at least the number of network nodes, the network-node identity, and the interconnection configuration of the network-node inputs and outputs.

An exemplary embodiment of the present invention also relates to a network having network nodes interconnected in a network topology and devices at the network nodes; each network node having memory to store data for indicating at least the network-node identity, and the network being designed for determining the current network topology, using at least the number of network nodes, the network-node identity, and the interconnection configuration of the network-node inputs and outputs, by reading out the memory of the network nodes and evaluating the progress of the data transmission during the reading-out.

An exemplary embodiment of the present invention may include a method for testing a network of the species, where changes to the network and to the connected devices and network nodes may be identified.

An exemplary method of the present invention may compare a current network topology to a reference network topology stored for the network, in order to detect a change in the number and/or type of devices connected to the network, a change in the number and/or type of network topology, and/or a change in the number and/or type of network nodes at which a change.

A reference network topology may be permanently stored, which is not modified or erased in response to the network being reset. The current network topology may be compared to the reference network topology, and changes to the network may be detected.

A reference network topology may be advantageously stored on demand by accepting a current network topology as the reference network topology, in that the data for the current network topology are read in from a central network-topology memory for the network, and from decentralized network-node memories, and the data read in are stored in a reference network-topology memory.

The testing of the network may be automatically carried out in response to a reinitialization of the network.

The comparison of the current network topology to the reference network topology may be carried out by comparing the content of the data stored in a network-topology comparison memory and a reference network-topology memory. In doing this, the data for the current network topology may be read in from a central network-topology memory for the network and from decentralized network-node memories, and stored in a network-topology comparison memory.

The reference network topology may be restored by automatically deactivating network nodes, network-node outputs, and/or devices at the network-node outputs, which are not provided in the reference network topology. This may not only allow the network to be tested, but also may protect the network from manipulation and may preclude it from being misused by improper, external devices.

The method may be applied to a network corresponding to the IEEE-1394 standard, but may equally be used for Universal Serial Bus (USB networks) or MOST networks, etc.

According to an exemplary embodiment of the present invention, a memory for permanently storing a reference network topology for the network and a comparator for comparing the current network topology to the reference network topology may be provided in the network of the species, in order to test the network and detect a change in the number and/or type of devices connected to the network, in the number and/or type of network topology, and/or in the number and/or type of network nodes at which a change may have occurred.

The network may be designed to automatically store the detected, current network topology on demand as a reference network topology, in the memory for the reference network topology. A current network topology recognized as being permissible may be defined as the reference network topology for future tests.

In addition, the network may be designed for automatic testing of the network after a reinitialization or after the addition or removal of a network component.

A network-topology comparison memory for storing the detected, current network topology may be provided in the network, in particular in a root network node. The comparator may then be designed to compare the contents of the data, which are stored in the network-topology comparison memory and the reference network-topology memory.

The network and, in particular, the network nodes may be designed to restore the reference network topology by automatically deactivating network nodes, network-node outputs, and/or devices at the network-node outputs, which may not be provided in the reference network topology.

The network may correspond to the IEEE-1394 standard or other appropriate standards, such as the Universal Serial Bus Standard (USB, MOST, HiQoS, CAN, etc.).

BRIEF DESCRIPTION OF THE DRAWINGS

FIG. 5 shows a tabular representation of the memory contents of the network topology map according to the 1394 standard.

FIG. 6 shows a tabular representation of the data packet, self-ID packet, transmitted by the network nodes according to the 1394 standard.

FIG. 7 shows the minimum content of the register memory for the network characteristics of a network node, according to the 1394 standard.

FIG. 8 shows general contents of the register memory of a network node, according to the 1394 standard.

DETAILED DESCRIPTION

Figure 1:
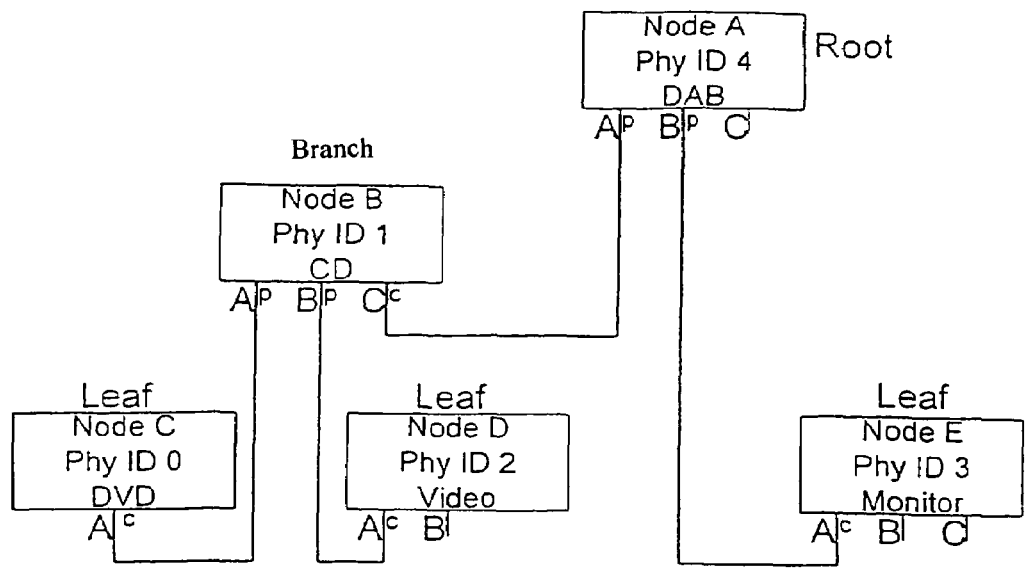
FIG. 1 shows a schematic representation of a network having six network nodes.

FIG. 1 shows the schematic representation of a network, which may be made up of six network nodes A through E. Forming the starting point of the network may be network node A, which may be designated as a root network node and, as such, may assume the management of the network. This network node A may be assigned identity number phy_id=4. It has three network-node outputs, A, B, and C. An additional network node B having identity number phy_id=1 may be connected to network-node output A at port C, network node A being designated as a parent and subjacent network node B being designated as a child.

Further network nodes C and D having identification numbers phy_id=0 und phy_id=2 may be connected to network-node terminals A and B. These network nodes C and D may form the end of the network and may therefore be designated as terminal nodes (leaf). They may constitute, in turn, child nodes of network node B, which maybe a parent node in this respect.

An additional terminal node E having identification number phy_id=3 may be connected to network terminal B of root network node A.

The network topology may be determined by the classification of the network nodes as parent and child with respect to one another, as well as by the physical characteristics of the network nodes and the devices connected to the network nodes. The network may be particularly suitable for digital audio and video applications, such as CD players, video recorders, camcorders, monitors, etc. In the example shown, the root network node forms a transmission interface for a device according to the Digital Audio Broadcast Standard DAB.

Figure 2:
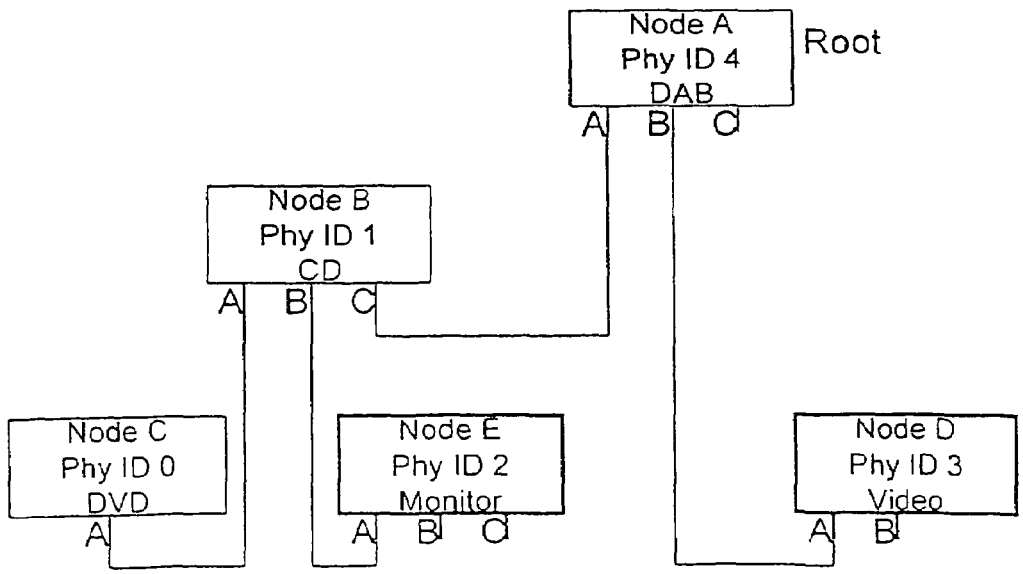
FIG. 2 shows a schematic representation of the modified network from FIG. 1.

FIG. 2 shows an example of a change to the network from FIG. 1, network nodes D and E being interchanged. Identity number phy_id remains a function of the position of the network node in the network, so that network node E obtains identification number phy_id=2 of network node D, which was previously at this position. The same applies to network node D, which obtains identification number phy_id=3.

The network, i.e. the individual network nodes, may be designed to be able to automatically detect the network topology. In this connection, the network topology may be stored in a so-called topology map in the root node.

Figure 3:
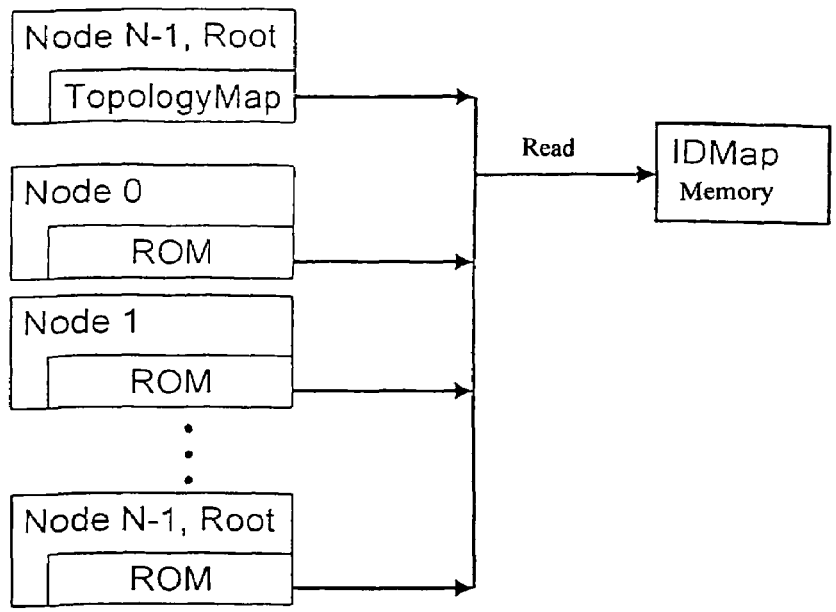
FIG. 3 illustrates the method for reading a current network topology into the network-topology comparison memory.

The determination of the network topology is outlined in FIG. 3. It can be seen that each network node may have a register memory ROM, in which at least the network-node identity and the interconnection configuration of the network-node outputs are stored. A unique manufacturing number, vendor-ID, and further information about the physical characteristics of the network node may be permanently written into each network node. The content will be discussed again later, with reference to FIGS. 5 through 8.

According to the IEEE-1394 standard, the current network topology may be automatically determined, as soon as a network node or device is removed or added.

A reset may be triggered after the removal or addition of the node. The assignments may be made anew, i.e. a different node may become the root. The transmission of the information may proceed in a partially independent manner, without constant renewal of the demand by the root node.

Information from subordinate network nodes 0 through N-2 may then be supplied to the root network node, and the number of network nodes in the network, identification numbers phy_id, information about the communication characteristics and physical characteristics of the network nodes, etc. may be stored in the so-called topology map. The detailed contents of the topology map are explained later on the basis of FIG. 5.

With the aid of the topology map, the communication in the network may be controlled by the root network nodes.

According to the present invention, a current comparison network topology may now be stored in the so-called ID-map memory, in that the contents of the data may be read out the topology map and out of network-node register memories ROM and stored in a specific manner in the ID-map memory.

Figure 4:
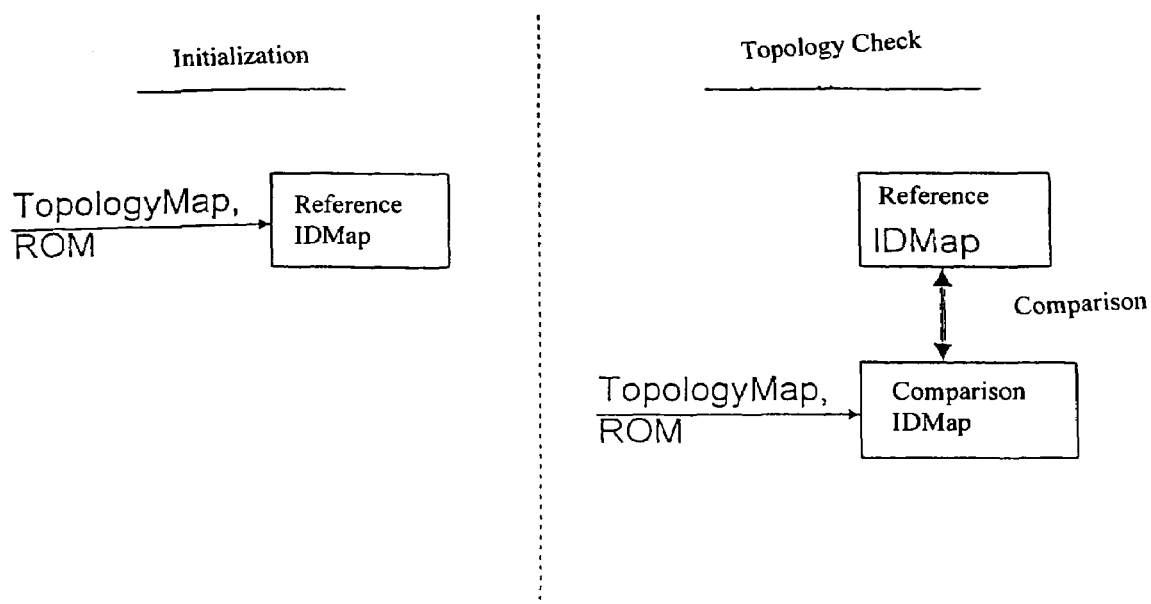
FIG. 4 illustrates the method for initializing the reference network topology and checking the current network topology.

FIG. 4 illustrates that, when the network is initialized at the beginning, a reference network topology may be stored on demand on the basis of a current network topology that is intended to be used as a reference network topology. The topology map and register memory ROM of network nodes 0 to N-1 may be read in, as is illustrated in FIG. 3.

The network may be automatically checked on demand or in response to the network being reset, in that the current network topology may be compared to the reference network topology. According to the IEEE-1394 standard, a reset may be automatically carried out, for example, as soon as a network node or terminal equipment is added to or removed from the network. A reset may also be triggered for other reasons, such as in response to the power mode being changed from standby-mode to on-mode.

The network may be tested so that the network comparison topology may be determined by reading in the contents of the data of the topology map and register memory ROM of the network nodes, and may be compared to the permanently stored reference network topology (reference-ID map).

The changes to the network may be displayed on a monitor, e.g. printed out by a printer, but also may be corrected. The reference network topology may be restored by automatically deactivating the improperly added network nodes or devices.

The contents of the data of the topology map according to the IEEE-1394 standard are shown in FIG. 5. The topology map may be first made up of basic information, such as the length, as well as basic information about the network, such as the node count and the number of data packets sent by the network nodes (self-ID count). In addition, the data packets sent by the network nodes may be sequentially stored.

The data packets sketched in FIG. 6 may be sent by the network nodes to the root network node. These data packets (self-ID packets) may be essentially made up of identification number phy_id of the network node, the number of time intervals (gap count), the speed (sp), the delay time (del), the voltage class (pwr), and information regarding the network-node terminals P0, P1, and P2. The phy_id may be automatically assigned by the reset process and may not be a physical network-node characteristic stored in the memory of the network node. Identification number phy_id may be uniquely determined by the order during the transmission of the self-ID packets in accordance with the order child/parent with respect to each other.

The network topology may be uniquely determined on the basis of the data packets, using identification number phy_id, network-node terminals P0, P1, and P2, as well as the node count. The additional information may not be necessarily required for testing the network, but may be helpful in detecting any manipulation at the network nodes or terminal equipment.

The necessary data contents may be read out and compared to each other, rather than the complete contents of the data, during the reading-out of register memory ROM of the network nodes, as well as during the reading-out of the topology map for generating the network comparison topology or the reference network topology.

FIG. 7 shows the minimum data content of the register memory of a network node, the minimum data content including header 01H and unique manufacturer identifier, vendor ID. Furthermore, the additional information sketched in FIG. 8 may be stored in the register memory of the network nodes. The contents of these data may not be of significance in the following, so that reference is made to the IEEE-1394 standard.

For the network of the species, it may be important for the network nodes to be designed to automatically generate the data packets (self-ID packets) and to send them to the root network node, so that the physical characteristics of the network nodes and the states of the corresponding network-node terminals may be entered in the topology map.

The appropriate network-management procedures may usually be implemented in an appropriately specialized, integrated circuit (chip). Therefore, the testing of the network and the network management may not be carried out by a host computer, but rather by the appropriately specialized, integrated circuits, or by software.

What is claimed is:

1. A method to test a network made up of network nodes and devices connected to the network nodes, the method comprising:

determining a current network topology using a number of the network nodes, each network node including a node memory to store first data, the first data indicating at least a network-node identity and an interconnection configuration of network-node outputs, using a network-node identity, and using an interconnection configuration of network-node inputs and network-node outputs, by reading in data for the current network topology from a central network-topology memory for the network, and from at least one decentralized network-node memory storing at least a network-node identity and an interconnection configuration of network-node outputs;

comparing the current network topology to a stored, reference network topology for the network, to detect a change in at least one of a number of devices connected to the network, types of the devices connected to the network, a network topology, the number of network nodes, and types of the network nodes;

restoring the reference network topology by automatically deactivating at least one of at least one network node, at least one network-node output, and at least one device at the network nodes, which are not provided in the reference network topology; and storing, only on demand, the current network topology as the reference network topology if it is determined that the current network topology is permissible.

2. The method of claim 1, wherein the current network topology is stored as the reference network topology by storing the data for the current network topology in a reference network-topology memory.

3. The method of claim 1, wherein the method is performed automatically in response to the network being re-initialized.

4. The method of claim 1, further comprising:
storing the data for the current network topology in a network-topology comparison memory; and
comparing the current network topology to the reference network topology by comparing first contents of the data stored in the network-topology comparison memory and second contents of further data stored in a reference network-topology memory.

5. The method of claim 1, wherein the network uses an IEEE-1394 standard.

6. The method of claim 1, further comprising:
storing the data for the current network topology in a network-topology comparison memory; and
comparing the current network topology to the reference network topology by comparing first contents of the data stored in the network-topology comparison memory and second contents of further data stored in a reference network-topology memory;
wherein the current network topology is stored as the reference network topology by storing the data for the current network topology in a reference network-topology memory, and wherein the method is performed automatically in response to the network being reinitialized.

7. The method of claim 6, wherein the network uses an IEEE-1394 standard.

8. A network, comprising:
network nodes interconnected in a network topology, each of the network nodes including a node memory to store first data, the first data indicating at least a network-node identity and an interconnection configuration of network-node outputs;
devices at the network nodes;
a network memory for storing a reference network topology for the network; and
a comparator to compare a current network topology to the reference network topology, to test the network and to detect a change in at least one of a number of devices connected to the network, types of the devices connected to the network, a network topology, a number of network nodes, and types of the network nodes;
wherein the network is configured to determine the current network topology, using at least the number of network nodes, the network-node identity, and the interconnection configuration of the network-node outputs, by reading out the node memory of the network nodes,
wherein the network is configured to restore the reference network topology by automatically deactivating at least one of at least one network node, at least one network-node output, and at least one device at the network nodes, which are not provided in the reference network topology, and
wherein the network is configured to store, only on demand, the current network topology as the reference network topology if it is determined that the current network topology is permissible.

9. The network of claim 8, wherein the network is configured to automatically store, on demand, the current network topology as the reference network topology in the network memory.

10. The network of claim 8, wherein the network is configured to automatically test the network after one of re-initialization, an addition of a network component, and a removal of a network component.

11. The network of claim 8, wherein:
a network-topology comparison memory is configured to store the current network topology; and
the comparator is configured to compare first contents of second data stored in the network-topology comparison memory and second contents of third data in the network memory.

12. The network of claim 8, wherein the network uses an IEEE-1394 standard.

13. The network of claim 8, wherein the network is configured to automatically store, on demand, the current network topology as the reference network topology in the network memory, wherein the comparator is configured to compare first contents of second data stored in the network-topology comparison memory and second contents of third data in the network memory, and wherein the network is configured to automatically test the network after one of re-initialization, an addition of a network component, and a removal of a network component.

14. The network of claim 13, wherein the network uses an IEEE-1394 standard.

* * * * *

UNITED STATES PATENT AND TRADEMARK OFFICE
CERTIFICATE OF CORRECTION

PATENT NO. : 7,602,736 B2 Page 1 of 1
APPLICATION NO. : 10/450733
DATED : October 13, 2009
INVENTOR(S) : Schoeberl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Fifth Day of October, 2010

David J. Kappos
*Director of the United States Patent and Trademark Office*